United States Patent
Boyd et al.

(10) Patent No.: US 12,143,747 B2
(45) Date of Patent: *Nov. 12, 2024

(54) SUBTITLE PRESENTATION BASED ON VOLUME CONTROL

(71) Applicant: Snap Inc., Santa Monica, CA (US)

(72) Inventors: Nathan Kenneth Boyd, Los Angeles, CA (US); Andrew Grosvenor Cooper, Los Angeles, CA (US); David Michael Hornsby, Surrey (GB); Georgiy Kassabli, London (GB); Matthew Thompson, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,531

(22) Filed: May 22, 2023

(65) Prior Publication Data
US 2023/0300286 A1    Sep. 21, 2023

Related U.S. Application Data

(63) Continuation of application No. 17/679,742, filed on Feb. 24, 2022, now Pat. No. 11,695,899, which is a
(Continued)

(51) Int. Cl.
*G06F 3/0482*      (2013.01)
*G06F 3/04847*     (2022.01)
(Continued)

(52) U.S. Cl.
CPC .......... *H04N 5/278* (2013.01); *G06F 3/0482* (2013.01); *G06F 3/04847* (2013.01);
(Continued)

(58) Field of Classification Search
CPC .... G06F 3/165; G06F 3/04847; G06F 3/0482; G06F 3/0486; G06F 3/0488;
(Continued)

(56) References Cited

U.S. PATENT DOCUMENTS 10,965,888 B1    3/2021    Boyd et al.
11,290,661 B2    3/2022    Boyd et al.
(Continued)

OTHER PUBLICATIONS

"U.S. Appl. No. 16/674,913, Examiner Interview Summary mailed Oct. 9, 2020", 3 pgs.
(Continued)

*Primary Examiner* — Rayeez R Chowdhury
(74) *Attorney, Agent, or Firm* — Schwegman Lundberg & Woessner, P.A.

(57) ABSTRACT

Systems and methods are provided for presenting subtitles. The systems and methods include accessing, by a user device, a video discovery graphical user interface that includes a plurality of videos; receiving a user input that gradually reduces volume of the user device; determining that the volume of the user device has gradually been reduced by the user input until a mute state has been reached in which audio output of the user device is disabled; and in response to determining that the volume of the user device has gradually been reduced until the mute state has been reached, automatically causing subtitles of a first video of the plurality of videos to be displayed during playback of the first video.

20 Claims, 14 Drawing Sheets

Related U.S. Application Data continuation of application No. 17/183,868, filed on Feb. 24, 2021, now Pat. No. 11,290,661, which is a continuation of application No. 16/674,913, filed on Nov. 5, 2019, now Pat. No. 10,965,888.

(60) Provisional application No. 62/871,554, filed on Jul. 8, 2019.

(51) Int. Cl.
<br>  *G06F 3/0486*    (2013.01)
<br>  *G06F 3/16*     (2006.01)
<br>  *G11B 27/036*    (2006.01)
<br>  *H04N 5/278*    (2006.01)

(52) U.S. Cl.
<br>  CPC ............ *G06F 3/0486* (2013.01); *G06F 3/165* (2013.01); *G11B 27/036* (2013.01)

(58) Field of Classification Search
<br>  CPC .. G06F 3/0484; G06F 3/04883; G06F 16/345; G06F 3/04842; G06F 3/167; G06F 40/45; G06F 3/04886; G06F 11/1438; G06F 11/1441; G06F 16/00; G06F 16/3326; G06F 21/568; G06F 21/575; G06F 40/242; G06F 40/253; G06F 40/279; G06F 40/284; G06F 40/56; G06F 9/4406; G06F 9/4418
<br>  See application file for complete search history.

(56) References Cited

U.S. PATENT DOCUMENTS

| | | | |
|---|---|---|---|
| 11,695,899 B2 | 7/2023 | Boyd et al. | |
| 2002/0154246 A1* | 10/2002 | Hawkins | H04N 21/4394 348/E5.122 |
| 2005/0038661 A1 | 2/2005 | Momosaki et al. | |
| 2005/0129252 A1 | 6/2005 | Heintzman et al. | |
| 2006/0044479 A1 | 3/2006 | Heo | |
| 2007/0220021 A1 | 9/2007 | Kato et al. | |
| 2007/0245374 A1 | 10/2007 | Wu | |
| 2010/0229078 A1 | 9/2010 | Otsubo et al. | |
| 2012/0084650 A1* | 4/2012 | Uchimura | G06F 3/0484 715/716 |
| 2013/0073962 A1* | 3/2013 | Pendergast | G11B 27/28 715/716 |
| 2015/0370402 A1* | 12/2015 | Checkley | G06F 3/0487 345/173 |
| 2016/0133298 A1* | 5/2016 | Zhou | H04N 21/4884 386/248 |
| 2016/0170709 A1* | 6/2016 | Jang | H04N 21/47205 715/727 |
| 2020/0084505 A1* | 3/2020 | Reid | H04N 21/4396 |
| 2021/0185244 A1 | 6/2021 | Boyd et al. | |
| 2022/0182558 A1 | 6/2022 | Boyd et al. | |

OTHER PUBLICATIONS

"U.S. Appl. No. 16/674,913, Final Office Action mailed Aug. 13, 2020", 12 pgs.

"U.S. Appl. No. 16/674,913, Non Final Office Action mailed Apr. 30, 2020", 9 pgs.

"U.S. Appl. No. 16/674,913, Notice of Allowance mailed Nov. 27, 2020", 13 pgs.

"U.S. Appl. No. 16/674,913, Response filed Jul. 13, 2020 to Non Final Office Action mailed Apr. 30, 2020", 10 pgs.

"U.S. Appl. No. 16/674,913, Response filed Oct. 13, 2020 to Final Office Action mailed Aug. 13, 2020", 11 pgs.

"U.S. Appl. No. 17/183,868, Non Final Office Action mailed Sep. 2, 2021", 13 pgs.

"U.S. Appl. No. 17/183,868, Notice of Allowance mailed Nov. 29, 2021", 5 pgs.

"U.S. Appl. No. 17/183,868, Response filed Nov. 16, 2021 to Non Final Office Action mailed Sep. 2, 2021", 10 pgs.

"U.S. Appl. No. 17/679,742, Non Final Office Action mailed Oct. 6, 2022", 12 pgs.

"U.S. Appl. No. 17/679,742, Notice of Allowance mailed Feb. 22, 2023", 6 pgs.

"U.S. Appl. No. 17/679,742, Response filed Dec. 13, 2022 to Non Final Office Action mailed Oct. 6, 2022", 9 pgs.

U.S. Appl. No. 16/674,913 U.S. Pat. No. 10,965,888, filed Nov. 5, 2019, Subtitle Presentation Based on Volume Control.

U.S. Appl. No. 17/183,868 U.S. Pat. No. 11,290,661, filed Feb. 24, 2021, Subtitle Presentation Based on Volume Control.

U.S. Appl. No. 17/679,742 U.S. Pat. No. 11,695,899, filed Feb. 24, 2022, Subtitle Presentation Based on Volume Control.

U.S. Appl. No. 18/156,276, filed Jan. 18, 2023, Video Sound Control.

* cited by examiner

SUBTITLE PRESENTATION BASED ON VOLUME CONTROL

CLAIM FOR PRIORITY

This application is a continuation of U.S. patent application Ser. No. 17/679,742, filed Feb. 24, 2022, which is a continuation of U.S. patent application Ser. No. 17/183,868, filed Feb. 24, 2021, now issued as U.S. Pat. No. 11,290,661, which is a continuation of U.S. patent application Ser. No. 16/674,913, filed Nov. 5, 2019, now issued as U.S. patent Ser. No. 10/965,888, which claims the benefit of priority to U.S. Provisional Application Ser. No. 62/871,554, filed Jul. 8, 2019, each of which is herein incorporated by reference in their entireties.

TECHNICAL FIELD

The present disclosure relates generally to presenting subtitles on mobile devices, and more particularly to providing subtitles for user-generated content or any other suitable content.

BACKGROUND

Modern day user devices are used by users to consume videos throughout the day. Often users consume such videos without audio to avoid disrupting other people in their surroundings. While most videos users consume can be enjoyed without audio, adding subtitles to such videos enhances the user experience.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
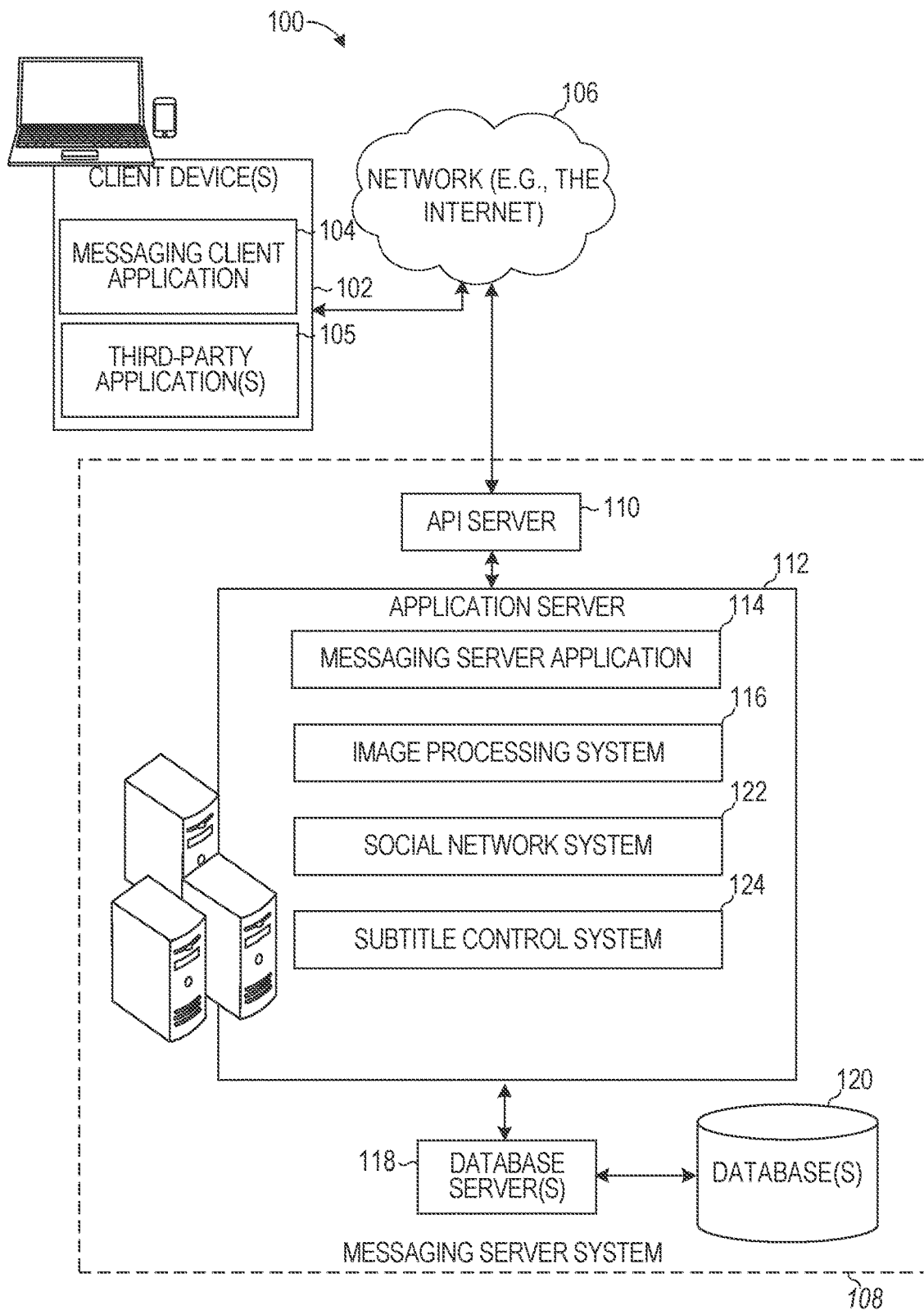
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume content, and specifically videos, on their mobile device without audio or sound. Most content the users consume can be enjoyed without sound. But in many cases, the overall enjoyment of the content can be enhanced with the addition of subtitles. Much content that users consume on mobile devices is user-generated, and particularly so for content consumed on social media platforms. However, typical systems fail to provide an easy-to-use and resource-efficient interface to generate subtitles and, as a result, the user-generated content typically does not include subtitles. Also, even when such content being consumed without audio does include subtitles, the subtitles are only presented when specifically requested by the user. Namely, to view the subtitles, the user has to stop viewing the content, navigate through several menus, activate the subtitles and then return to viewing the content with the subtitles. These steps place a burden on the user and make the user experience less seamless and enjoyable. In addition, because of this additional burden, users often fail to access the subtitles, which results in wasted resources dedicated to providing the unconsumed subtitles.

The disclosed embodiments improve the efficiency of using the electronic device by providing a subtitle control system that provides users with an efficient and easy-to-user interface for providing subtitles for user-generated content or any other suitable content. The subtitle control system, according to the disclosed embodiments, also improves the efficiency of using the electronic device by automatically controlling presentation of subtitles (when available for a given video) based on volume control activity. Specifically, according to the disclosed embodiments, a simple and straight-forward user interface is provided that allows a given user to view videos generated and provided by the given user. The given user can selectively add subtitles to one or more of the videos by simply dragging a subtitles file, such as a SubRip Text file (SRT) or Video Timed Text file (VTT), over an icon or representation of the given video and/or by selecting an upload option for the given video. Once added, the subtitles are automatically processed and associated with the given video and made available for consumption to other users when the video is shared on a messaging application.

In this way, the disclosed embodiments improve the efficiency of using the electronic device by reducing complexity a user experiences in providing subtitles for a given video, and by reducing the number of screens and interfaces a user has to navigate through to add subtitles to a given video. This reduces the device resources (e.g., processor cycles, memory, and power usage) needed to accomplish a task with the device. Although subtitles and closed-captions (CC) may include different content, the term "subtitles" used in this disclosure applies equally to both. Specifically, subtitles provide a text alternative for dialogue of video footage—the spoken words of characters, narrators, and other vocal participants—while CC not only supplements dialogue like subtitles, but also includes other relevant parts of the soundtrack describing background noises, phones ringing, and other audio cues the need to be described.

In some embodiments, a determination of whether to present subtitles to a given user viewing a video is made on the basis of volume controls. Namely, the disclosed embodiments seamlessly, and without user input, control whether to present subtitles for a video being consumed based on volume settings of the device. In particular, the disclosed embodiments determine whether a dedicated physical mute switch of the device is currently in the enabled position (meaning that sound of the device is muted). In response to determining that the physical mute switch is in the enabled position, the subtitles are automatically presented for any video the user consumes on the device. Also, the disclosed embodiments determine whether a default subtitles setting of the device is currently in the enabled state. In response to determining that the default subtitles setting is in the enabled position, the subtitles are automatically presented for any video the user consumes on the device. In some cases, the default subtitles setting and the physical mute switch are in states in which subtitles are not enabled by default and the audio of the device is not being muted by the physical mute switch. In such circumstances, the disclosed embodiments monitor volume UP/DOWN controls to determine whether, while watching a given video, the user is gradually reducing the volume (e.g., by continuous activation of the volume DOWN control or by pressing the VOLUME down control multiple times). When the volume is reduced gradually until the output volume is muted, the disclosed embodiments automatically enable presentation of subtitles for the current video being consumed and any subsequent video the user consumes.

In this way, the disclosed embodiments improve the efficiency of using the electronic device by reducing the number of screens and interfaces a user has to navigate through to view subtitles for a given video. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a subtitle control system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

In some embodiments, the messaging client application 104 may present a user with a video discovery graphical user interface. The video discovery graphical user interface may display one or more interactive representations (e.g., icons or thumbnails) that identify respective videos. The messaging client application 104 receives a user selection of a first one of the interactive representations. In response to receiving the user selection, the messaging client application 104 retrieves a first video that corresponds to the selected interactive representation and plays back or displays the video. In some cases, the first video may include a sequence of one or more video clips (e.g., 10 second video clips). The user can advance between each video clip in the video by tapping (physically touching for less than a threshold period of time (e.g., 1 second)) on the screen. In response to the user tapping on the screen, the messaging client application 104 retrieves a next video clip in the sequence. Once all of the video clips or once the first video is completely played back, a second video may be selected (e.g., by the user manually selecting a particular interactive representation or automatically by selecting a video that matches user interests). The second video may be played back and presented to the user.

In some embodiments, the messaging client application 104 determines whether to present subtitles for a video that is being played back based on volume controls of the user device. Specifically, the messaging client application 104 may monitor the status of a physical mute switch to determine whether the switch is in a position indicating that audio is muted on the device or is in a position indicating that audio is unmuted on the device. Based on the position of the physical mute switch, the messaging client application 104 determines whether to present subtitles (if any exist) for a given video being played back by the video discovery graphical user interface. As an example, in response to determining that the physical mute switch is in the enabled position (indicating that audio is muted on the device), the subtitles are automatically presented for any video the user consumes on the device. Specifically, the messaging client application 104, when presenting a given video to the user in the video discovery graphical user interface, may also retrieve subtitles for the given video if the physical mute switch is in the enabled position.

In some embodiments, the physical mute switch may be in the disabled position (indicating that audio is unmuted on the device). In such circumstances, the messaging client application 104 determines whether a default subtitles setting of the device is currently in the enabled state. Specifically, the user may access general device settings that are applicable globally to all applications installed and/or running on the user device. In the general device settings, the user can navigate to a graphical user interface that presents audio options. Among the audio options, a default subtitles setting option may be presented and toggled ON/OFF by the user. If this setting is toggled ON, then the user device may invariably present subtitles for any content played back on the device for which subtitles are available. Specifically, in response to determining that the default subtitles setting is in the enabled position, the subtitles are automatically presented for any video the user consumes on the device including in the video discovery graphical user interface.

In some cases, the default subtitles setting and the physical mute switch are in states in which subtitles are not enabled by default and the audio of the device is not being muted by the physical mute switch. In such circumstances, the messaging client application 104 monitors volume UP/DOWN controls to determine whether, while watching a given video, the user is gradually reducing the volume (e.g., by continuous activation of the volume DOWN control or by pressing the VOLUME down control multiple times). When the volume is reduced gradually until the output volume is muted (while the physical mute switch is in the disabled position in which audio is unmuted), the messaging client application 104 automatically enables presentation of subtitles for the current video being consumed and any subsequent video the user consumes.

As an example, the messaging client application 104 may start presenting or playing back a first video selected in the video discovery graphical user interface without subtitles (e.g., because the physical mute switch is in the disabled position, a global subtitles option is not enabled, a subtitles option of the video discovery interface is not enabled, and volume of the device is set to 50%). While the first video is played back (e.g., halfway through a duration of the first video), the user may press a volume down button as many times as needed (or may hold the button depressed) until the volume of the device becomes set to 0%, indicating audio is muted. In response to detecting that the volume has become set to mute the audio, the messaging client application 104 automatically determines whether subtitles are available for the first video. If so, the messaging client application 104 retrieves the subtitles and presents the subtitles starting from the current view position of the first video.

In some cases, after the playback of the first video ends, a second video may be automatically or manually selected for playback. This second video may be selected while the physical mute switch is still in the disabled position, a global subtitles option is not enabled, a subtitles option of the video discovery interface is not enabled, and volume of the device is set to 0%. As a result, the second video may begin being played back with corresponding subtitles (if any) automatically. At some later time, after the second video ends playback or in the middle of playing back the second video, the user may navigate out or exit the video discovery graphical user interface. As an example, the user may access a camera application of the user device to capture a video.

While capturing the video, the user may raise the volume that was previously set to 0% using the volume button (e.g., by pressing the volume UP button one or more times) until volume is set to 20%. After finishing capturing the video, the user may exit the camera application and return to the video discovery graphical user interface. At this point, the user selects a third video to play back while the physical mute switch is in the disabled position, a global subtitles option is not enabled, a subtitles option of the video discovery interface is not enabled, and volume of the device is set to 20%. The third video may begin being played back without subtitles until one or more of the physical mute switch is switched to the enabled position, a global subtitles option is enabled, a subtitles option of the video discovery interface is enabled, and/or volume of the device is reduced to 0%.

In some embodiments, the messaging client application 104 presents a graphical user interface that allows a user to upload and edit one or more videos to be shared with one or more other users. After or before uploading a given video, the user can also upload a subtitles file for the video. The messaging client application 104 may allow the user to upload the subtitles file by dragging the subtitles file over an identifier of the given video the user has uploaded and/or by selecting an upload option in an editing interface. After the subtitles file is uploaded, the contents of the subtitles file are presented in a three-part display (one part for displaying content of the subtitles file, a second part for displaying a preview of the video, and a third part for providing editing options for the video). The user can review, modify, and change timing of various subtitles that are provided for the video. Once the user is satisfied, the user can save the video and share the video, which now includes the associated subtitles file, with other users.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the subtitle control system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the subtitle control system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The subtitle control system 124 allows users to add subtitles to content they create (e.g., user-generated content) and/or controls automatic presentation of subtitles for content being consumed by a given user based on volume controls. For example, subtitle control system 124 presents a simple and straight-forward graphical user interface that allows a given user to view videos generated and provided by the given user. The given user can selectively add subtitles to one or more of the videos by simply dragging a subtitles file, such as a SubRip Text file (SRT) or Video Timed Text file (VTT), over an icon or representation of the given video and/or by selecting an upload option for the given video. Once added, the subtitles are automatically processed and associated with the given video and made available for consumption to other users when the video is shared on a messaging application.

In some embodiments, the subtitle control system 124 controls whether to present subtitles for a given video being consumed based on volume settings of the device. In particular, the subtitle control system 124 determines whether a dedicated physical mute switch of the device is currently in the enabled position (meaning that sound of the device is muted). In response to determining that the physical mute switch is in the enabled position, the subtitle control system 124 automatically determines whether a subtitles file is associated with the video being consumed and, if so, automatically presents the subtitles with the video being consumed on the device. Also, the subtitle control system 124 determines whether a default subtitles setting of the device is currently in the enabled state. In response to determining that the default subtitles setting is in the enabled position, the subtitle control system 124 automatically presents the subtitles for any video the user consumes on the device. In some cases, the default subtitles setting and the physical mute switch are in states in which subtitles are not enabled by default and the audio of the device is not being muted by the physical mute switch. In such circumstances, the subtitle control system 124 monitors volume UP/DOWN controls (e.g., physical volume UP/DOWN switches or buttons on the device) to determine whether, while watching a given video, the user is gradually reducing the volume (e.g., by continuous activation of the volume DOWN control or by pressing the VOLUME down control multiple times). When the volume is reduced gradually until the output volume is muted, the subtitle control system 124 automatically enables presentation of subtitles for the current video being consumed and any subsequent video the user consumes.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
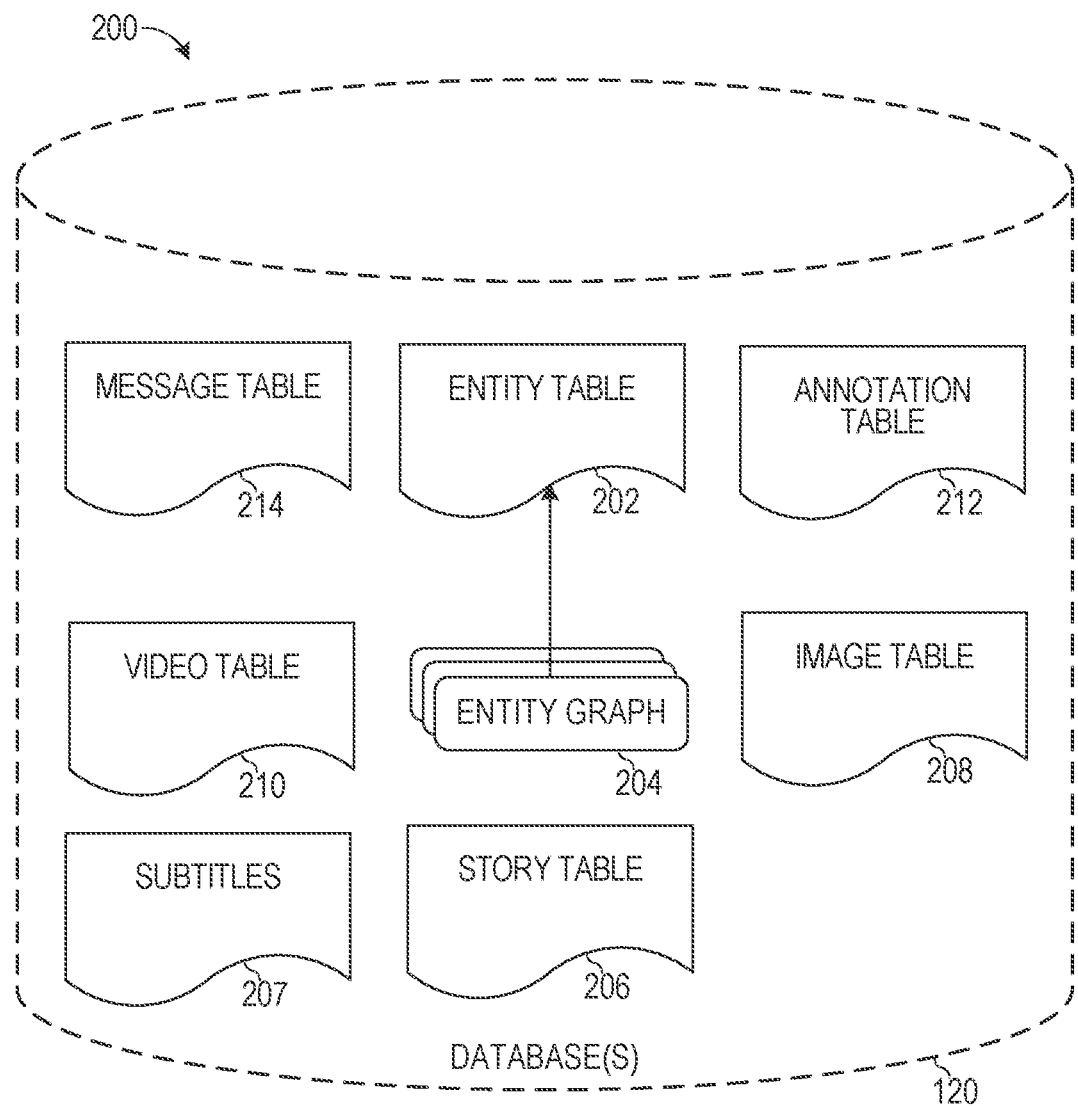
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Subtitles 207 stores subtitles for one or more videos available for consumption by the messaging client application 104. Namely, subtitles 207 stores a subtitles file (e.g., an SRT and/or VTT file) and a link to the associated video for the subtitles file. In some implementations, subtitles that are received for a given video are stored in two formats (e.g., SRT and VTT). Specifically, in response to a given user uploading a subtitles file in a first format (e.g., an SRT file), the subtitles file in the first format is stored in association with the corresponding video. Also, the subtitles file in the first format is automatically converted to a subtitles file in a second format (e.g., a VTT file) and also stored in association with the video in the second format. A given request for subtitles for a given video may specify the type of device on which the subtitles are to be presented and the corresponding subtitles in the first or second format are retrieved and returned for presentation with the video.

When subtitles for a given video being played or presented are enabled (e.g., a determination is made by the subtitle control system 124 to automatically present subtitles), the subtitles 207 for the given video are accessed and retrieved (e.g., by obtaining a title or identifier of the given video being consumed and searching the subtitles 207 for any subtitles that are linked to the title or identifier of the given video). The subtitles retrieved from subtitles 207 that are linked to the given video being played are then presented together with the given video being played.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
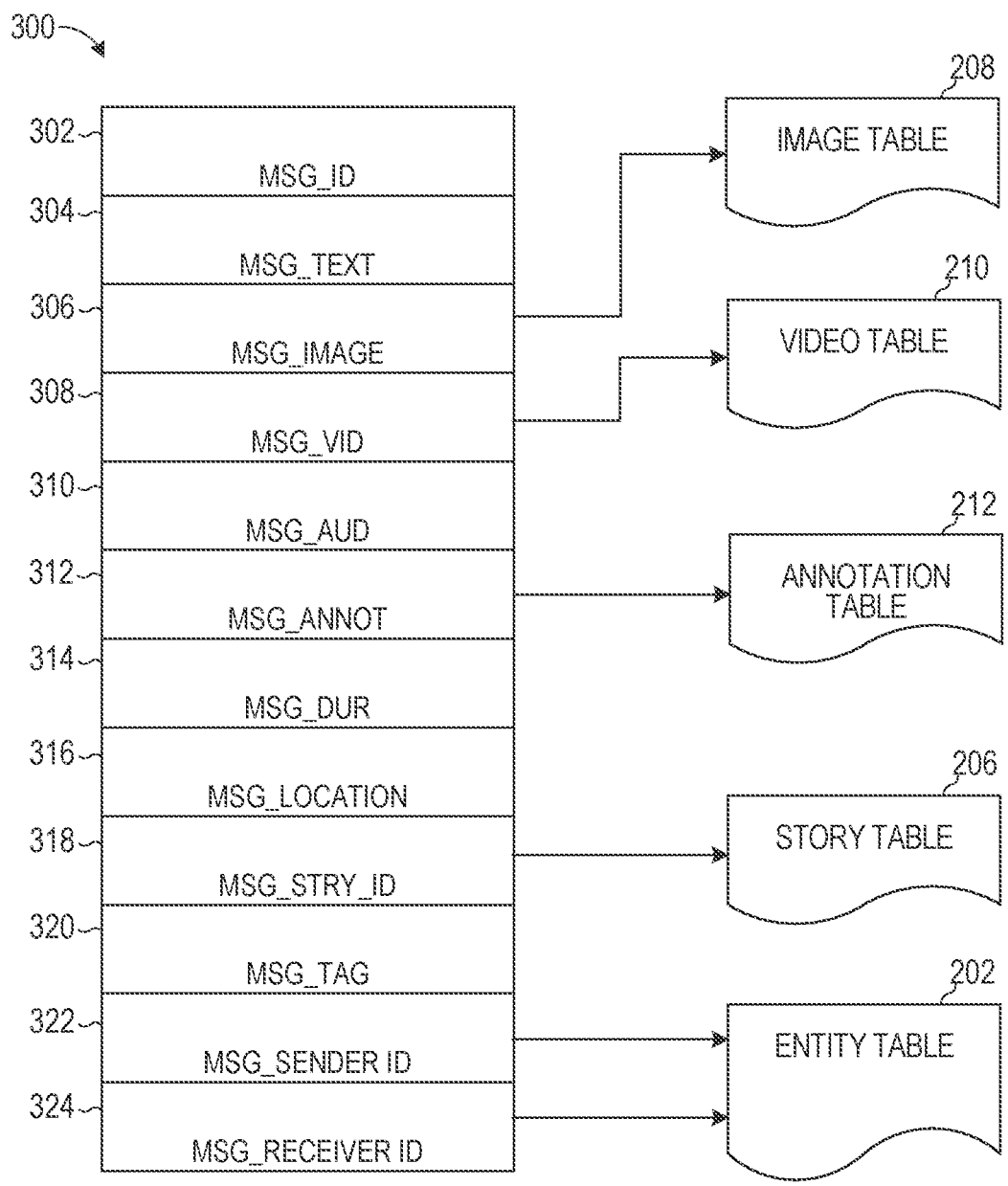
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
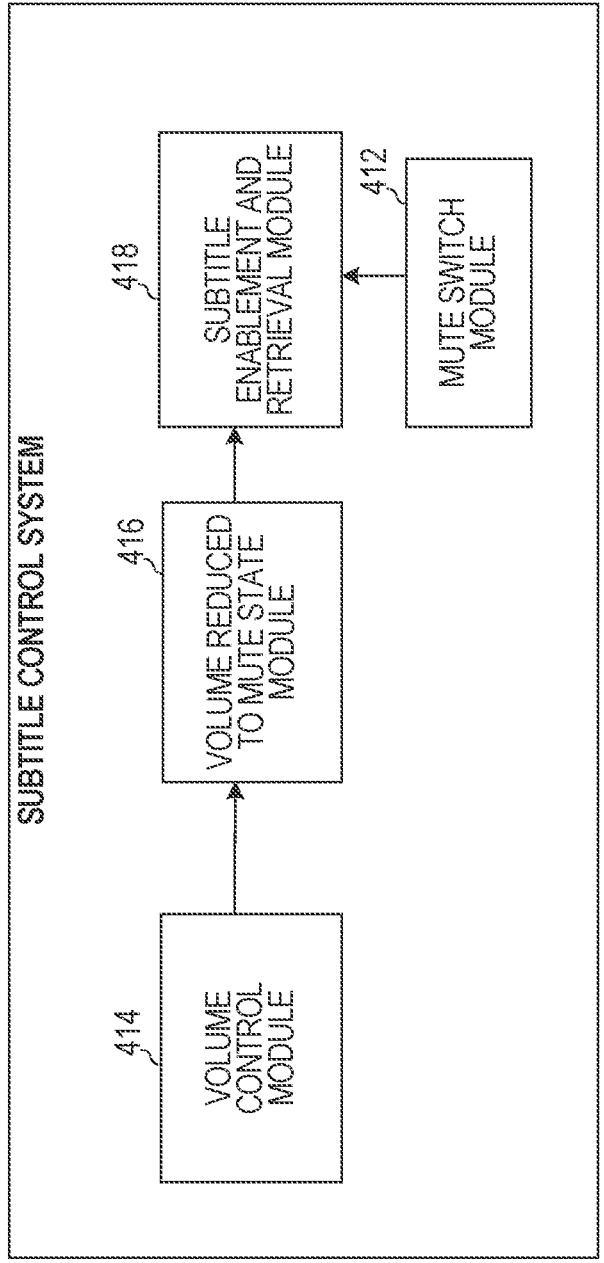
FIG. 4 is a block diagram showing an example subtitle control system, according to example embodiments.

FIG. 4 is a block diagram showing an example subtitle control system 124, according to example embodiments. Subtitle control system 124 includes a volume control module 414, a volume reduced to mute state module 416, a mute switch module 412, and a subtitle enablement and retrieval module 418.

Volume control module 414 continuously (or in response to detecting activation of a volume button) monitors volume controls of a user device (e.g., client device 102). The volume controls may include physical volume UP/DOWN buttons on the user device. In some cases, the volume control module 414 monitors the volume controls when a video is being played back by the messaging client application 104 and particularly in a video discovery graphical user interface. In some embodiments, the volume control module 414 may only monitor the volume controls when the physical mute switch of the user device is in the enabled position as determined by the mute switch module 412. In some embodiments, the volume control module 414 may only monitor the volume controls when a global default subtitles setting of the user device is set to a disabled state. In some embodiments, the volume control module 414 may only monitor the volume controls when a subtitles setting of the messaging client application 104 (and specifically the video discovery user interface) is set to a disabled state. In some embodiments, the volume control module 414 may only monitor the volume controls when any combination of the global default subtitles setting of the user device is set to a disabled state, the subtitles setting of the messaging client application 104 (and specifically the video discovery user interface) is set to a disabled state, and/or the physical mute switch of the user device is in the enabled position.

In response to the volume control module 414 detecting activation of a volume DOWN button on the user device (e.g., while a video is being played back), the volume control module 414 communicates with the volume reduced to mute state module 416 to determine a volume level of the user device. Specifically, as the volume DOWN button is gradually reducing a volume level of the user device, the current volume level (e.g., 15%) is compared to a mute level (e.g., 0%) by the volume reduced to mute state module 416. Once the current volume level reaches the mute level, the volume reduced to mute state module 416 determines that the volume level has been reduced to a mute level in which no audio is being output by the speakers of the user device. In response, the volume reduced to mute state module 416 instructs the subtitle enablement and retrieval module 418 to retrieve and display subtitles for the current video being played and any subsequently presented videos in the video discovery graphical user interface session.

In response to being instructed by the volume reduced to mute state module 416 to retrieve and display subtitles, volume control module 414 may retrieve an identifier of a current video being played by the video discovery graphical user interface. The identifier may be provided to a database to search subtitles 207 for any available subtitles for the video being played back. If a match is found in subtitles 207, the subtitles file is retrieved. In addition, a current play position is retrieved and used as an index in the subtitle file to access the correct set of subtitles for the current play position of the video (e.g., to access the subtitles corresponding to the 1:30 minute:second segment of the video). The subtitles are presented simultaneously over or next to the video frames of the video. In some cases, a language of the device is searched to determine whether language is desired in a specific language other than a default language. If so, the subtitles in the desired language (if available) are retrieved and displayed.

In some embodiments, the subtitle enablement and retrieval module 418 may access a display characteristics field that is stored on the user device. The subtitle enablement and retrieval module 418 may modify the display characteristics (e.g., the font size, color, and shape) of the subtitles that are presented with the video being played. The subtitles may be presented on an area of the screen that does not impede any important aspect of the video content.

In some embodiments, the subtitle enablement and retrieval module 418 may monitor user interactions while the video is being played to determine whether to display subtitles. For example, the subtitle enablement and retrieval module 418 may detect, by receiving an instruction from the mute switch module 412, that the mute switch has been moved to the enabled position in which audio of the device is muted (without the volume controls gradually reducing the volume level of 0%). In response, the subtitle enablement and retrieval module 418 may automatically retrieve and display subtitles for a video being played back and any subsequent videos that are played back.

In some embodiments, the subtitle enablement and retrieval module 418 may detect that a touch and hold action is performed by the user while the video is being played back. For example, the subtitle enablement and retrieval module 418 may detect physical contact by a user's finger with a display in which the video is being played back. The physical contact may be continuous for more than a threshold period of time (e.g., more than 3 seconds) in which the finger is not lifted or removed from physically contacting the display. In response, the subtitle enablement and retrieval module 418 may present an overlay on the video being played back that includes a menu of options. The options may include a subtitles option that allows a user to turn on or activate subtitles for the video discovery graphical user interface. An example of such a menu is shown in FIG. 7A.

Figure 7A:
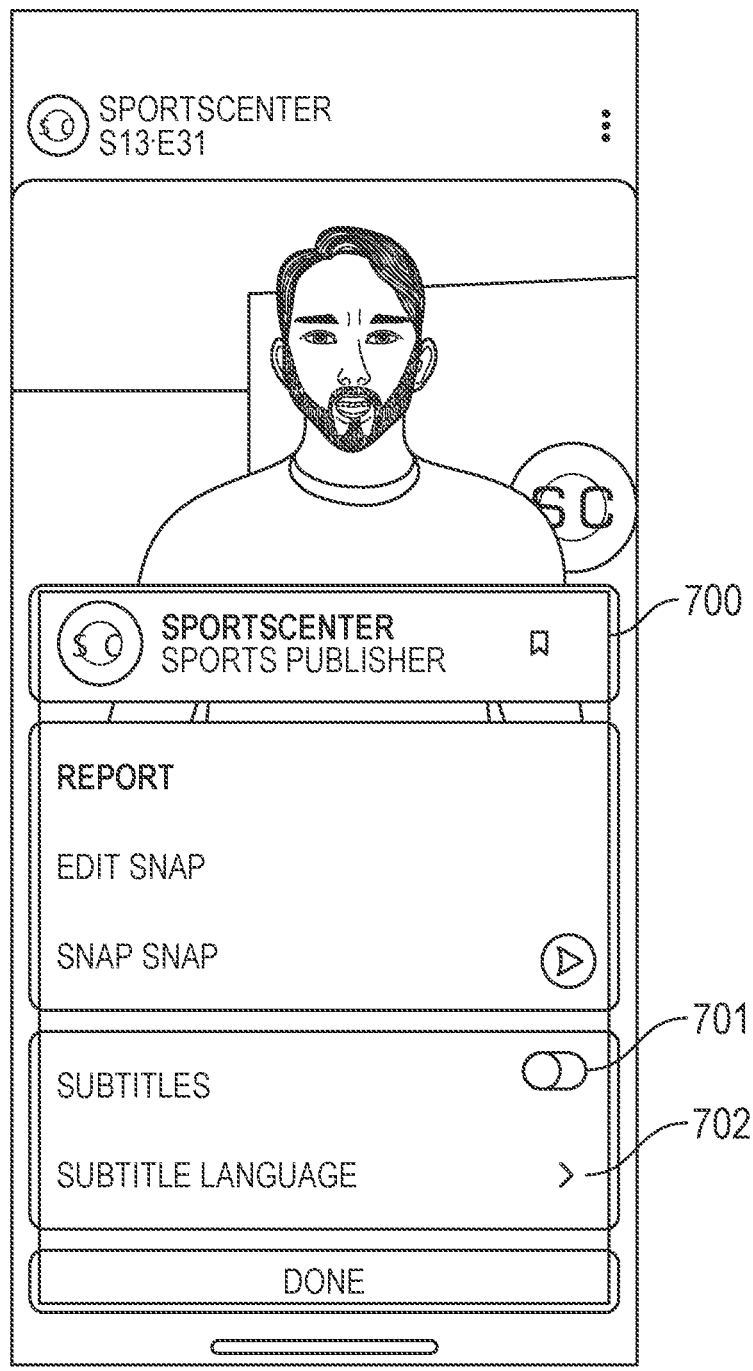
FIGS. 7A-E are illustrative inputs and outputs of the subtitle control system, according to example embodiments.

Particularly, as shown in FIG. 7A, menu 700 is presented in an overlay of a video being played back. The menu includes an identifier or title of the video being played back. Also, a subtitles option 701 is presented. The user can touch the option 701 to turn ON or activate subtitles for the video discovery graphical user interface. The user can also select the subtitles language option 702 to select a preferred language for subtitles. Once the subtitles option 701 is toggled to the enabled position, subtitles for any video played back via the discovery graphical user interface are displayed until the option is disabled.

Referring back to FIG. 4, in some embodiments, the subtitle enablement and retrieval module 418 may access the default global subtitles setting of the user device to determine whether to display subtitles. In response to determining that the default global subtitles setting of the user device is set to the enabled state, the subtitle enablement and retrieval module 418 may automatically retrieve and display subtitles for a video being played back and any subsequent videos that are played back.

Figure 5:
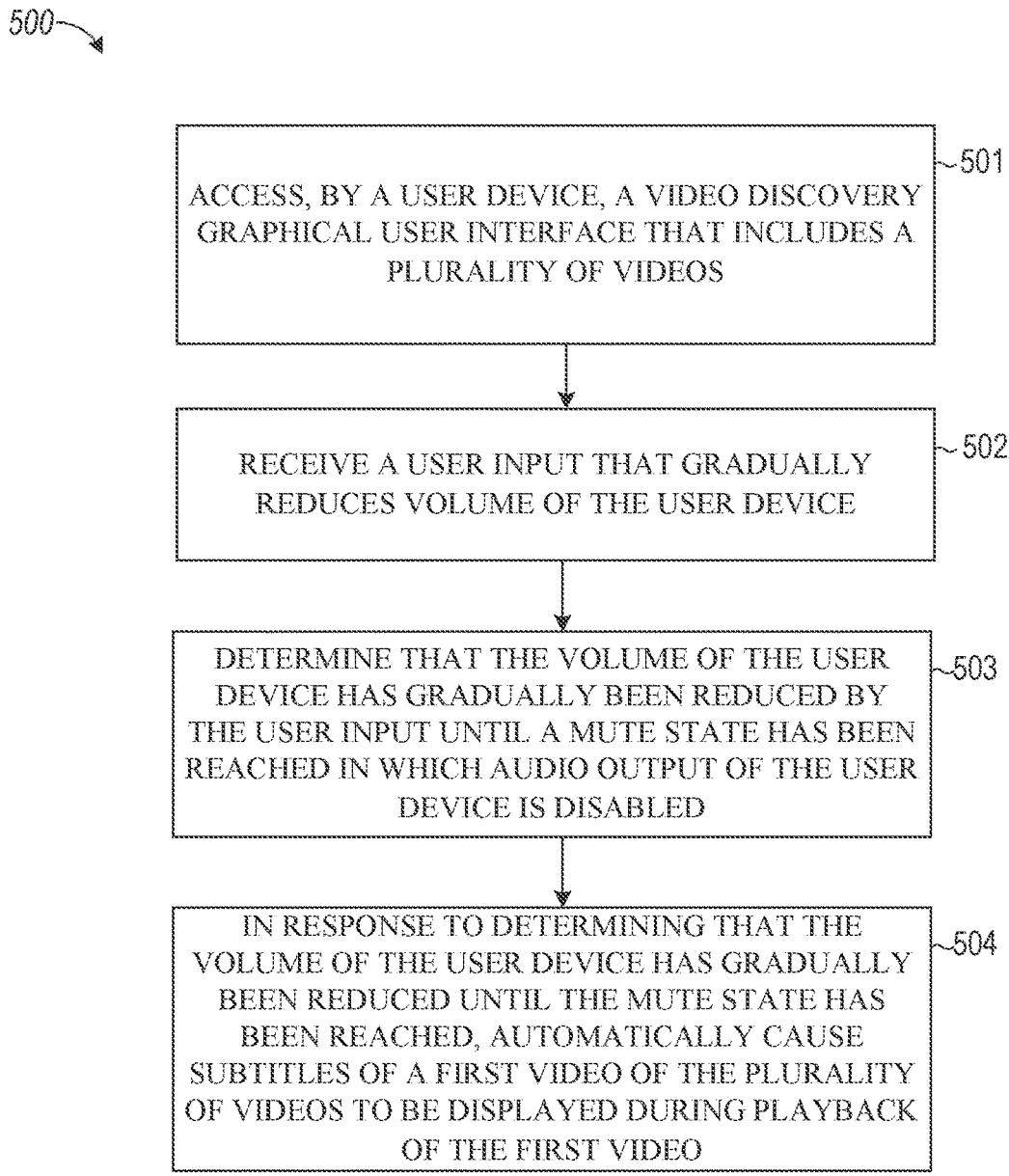
FIG. 5 is a flowchart illustrating example operations of the subtitle control system, according to example embodiments.

FIG. 5 is a flowchart illustrating example operations of the subtitle control system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the subtitle control system 124 accesses, by a user device, a video discovery graphical user interface that includes a plurality of videos.

At operation 502, the subtitle control system 124 receives a user input that gradually reduces volume of the user device. For example, the user can press a volume DOWN button a number of times to gradually reduce the volume level of the device from one level (e.g., 50%) to a second level (e.g., 0%).

At operation 503, the subtitle control system 124 determines that the volume of the user device has gradually been reduced by the user input until a mute state has been reached in which audio output of the user device is disabled. For example, the current volume level (e.g., 0%) is compared to a mute state level (e.g., 0%) to determine whether the volume of the user device has been gradually reduced until the mute state is reached. This determination is made independently of a position of the physical mute switch of the user device. Namely, in some cases, the physical mute switch may be in the enabled position (in which audio of the device is muted) but a volume level may be set to 50%. When the physical mute switch is in the enabled position, audio of content is OFF by default, but a user can select an option to present audio for an individual piece of content at the volume level that is set by the volume controls.

At operation 504, the subtitle control system 124, in response to determining that the volume of the user device has gradually been reduced until the mute state has been reached, automatically causes subtitles of a first video of the plurality of videos to be displayed during playback of the first video. For example, the subtitle control system 124 accesses a subtitles storage to determine whether an identifier of the video being played back includes a subtitles file. If so, the subtitle control system 124 retrieves the subtitles file and presents the subtitles together with the video being played back.

Figure 6:
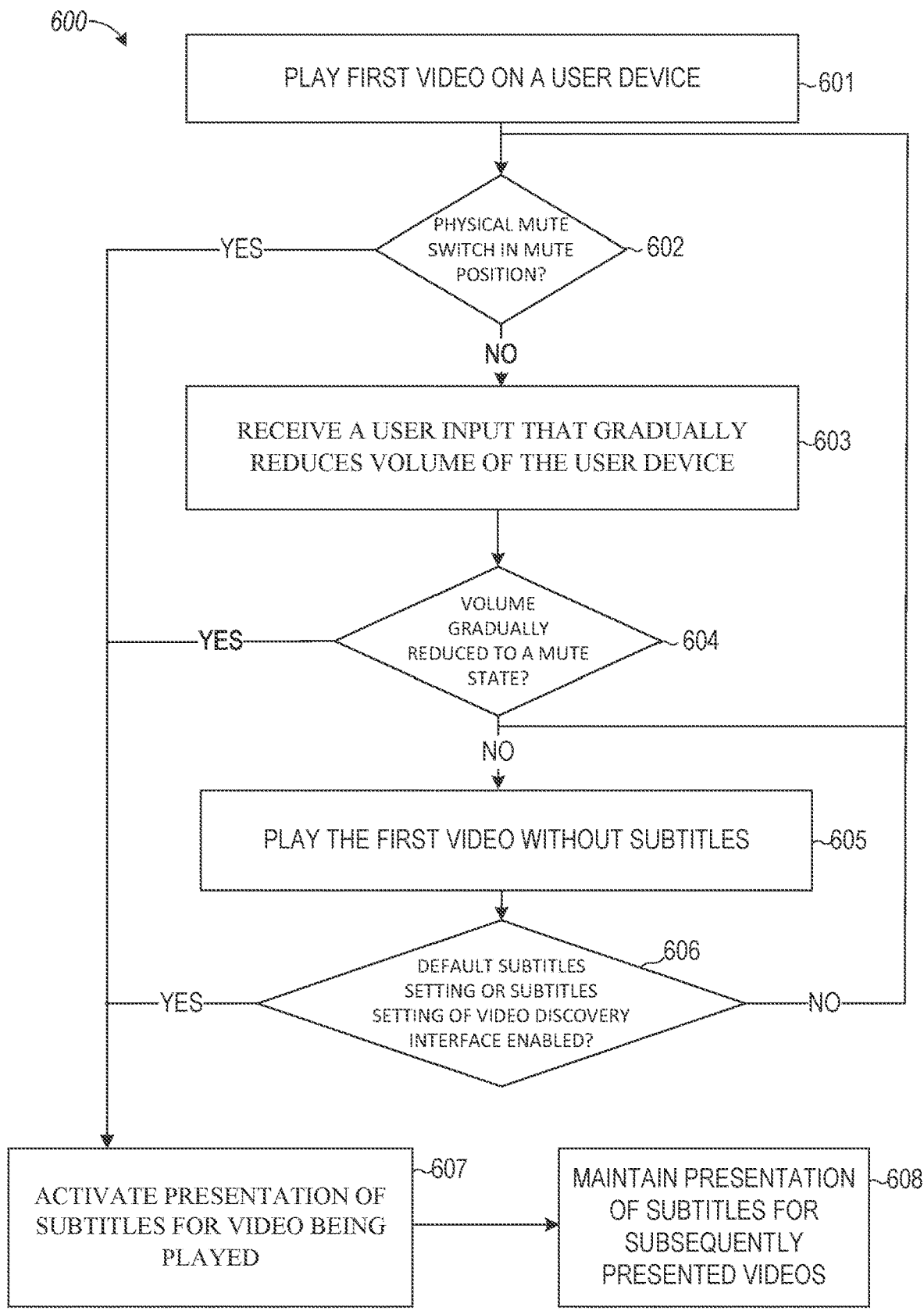
FIG. 6 is a flowchart illustrating example operations of the subtitle control system, according to example embodiments.

FIG. 6 is a flowchart illustrating example operations of the subtitle control system 124 in performing process 600, according to example embodiments. The process 600 may be embodied in computer-readable instructions for execution by one or more processors such that the operations of the process 600 may be performed in part or in whole by the functional components of the messaging server system 108 and/or third-party application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the subtitle control system 124 plays a first video on a user device (e.g., client device 102).

At operation 602, the subtitle control system 124 determines whether a physical mute switch of the user device is in the mute position. In response to determining that the physical mute switch of the user device is in the mute position, the subtitle control system 124 proceeds to operation 607; otherwise, the subtitle control system 124 proceeds to operation 603.

At operation 603, the subtitle control system 124 receives a user input that gradually reduces volume of the user device. For example, the subtitle control system 124 receives a user activation or pressing of a volume DOWN button on the user device. Alternatively, the user can view a volume level of the device and can drag a graphical user interface element for volume level from one level (e.g., 50%) to another level (e.g., 0%).

At operation 604, the subtitle control system 124 determines whether volume of the user device is gradually reduced to a mute state. In response to determining that volume of the user device is gradually reduced to a mute state, the subtitle control system 124 proceeds to operation 607; otherwise, the subtitle control system 124 proceeds to operation 605.

At operation 605, the subtitle control system 124 plays the first video without presenting subtitles.

At operation 606, the subtitle control system 124 determines whether a default subtitles setting or a subtitles setting of a video discovery interface is enabled. In response to determining that the default subtitles setting or the subtitles setting of a video discovery interface is enabled, the subtitle control system 124 proceeds to operation 607; otherwise, the subtitle control system 124 proceeds to operation 602.

At operation 607, the subtitle control system 124 activates presentation of subtitles for a video being played. For example, the subtitle control system 124 retrieves an identifier of a video being played and uses the identifier of the video (and a device type) to retrieve a subtitles file in a particular format suitable for display on the device type from a database. The subtitles from the retrieved file are presented together with the video being played back.

At operation 608, the subtitle control system 124 maintains presentation of subtitles for subsequently presented videos. For example, after the first video ends playback, a second video may be automatically or manually selected by a user for playback. The second video may begin being played back with subtitles (if any) being displayed.

Figure 7B:
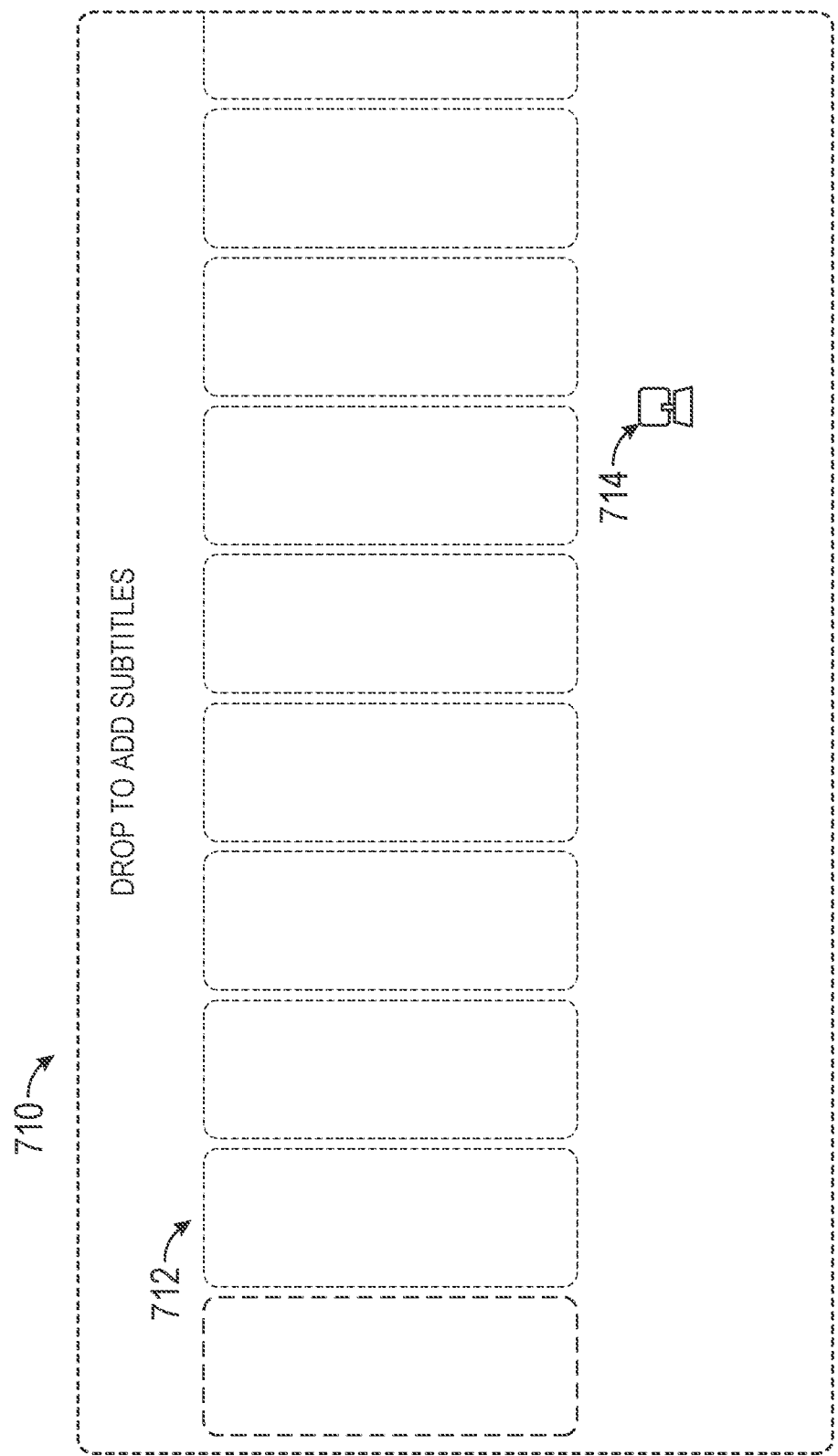
Figure 7C:
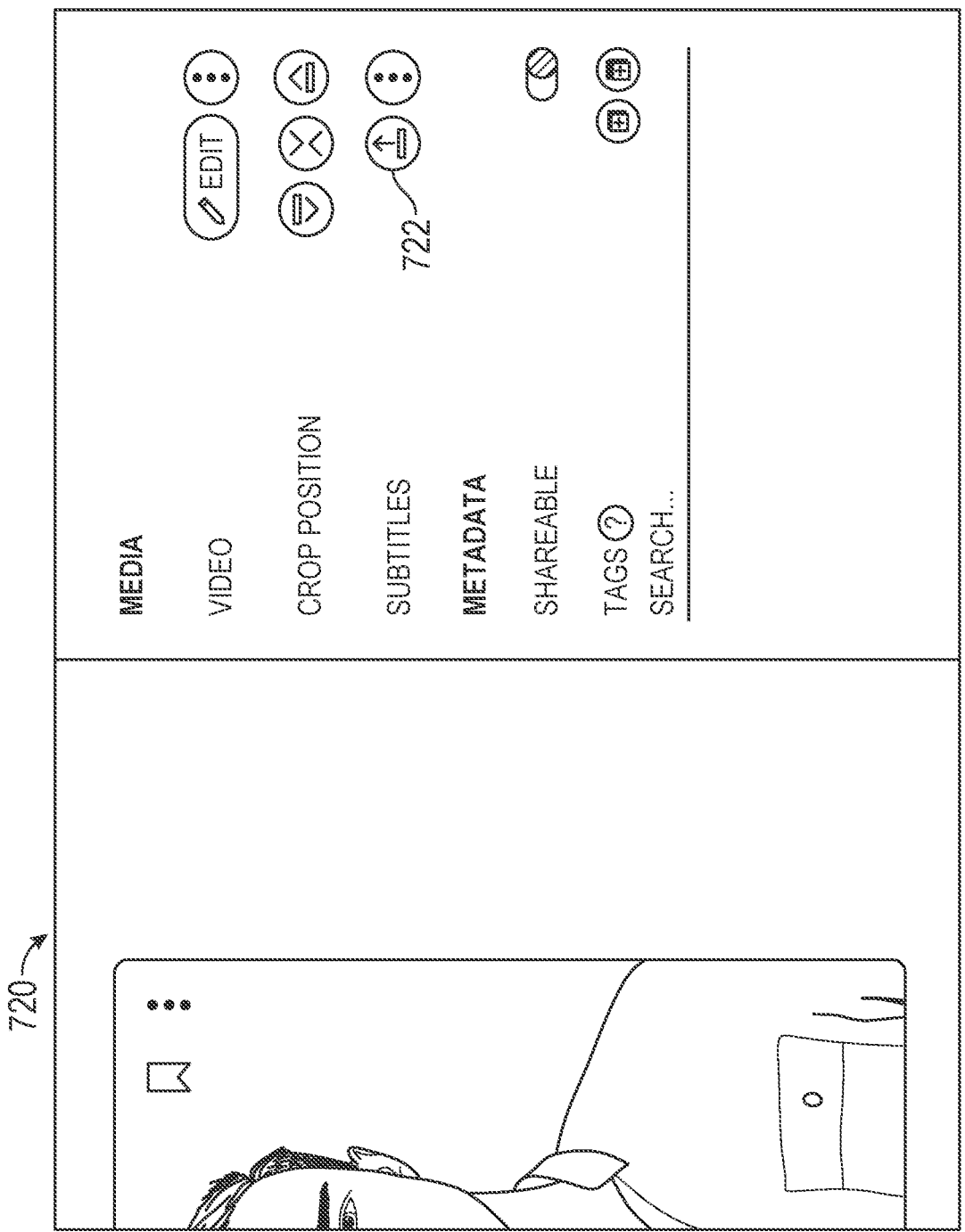
Figure 7D:
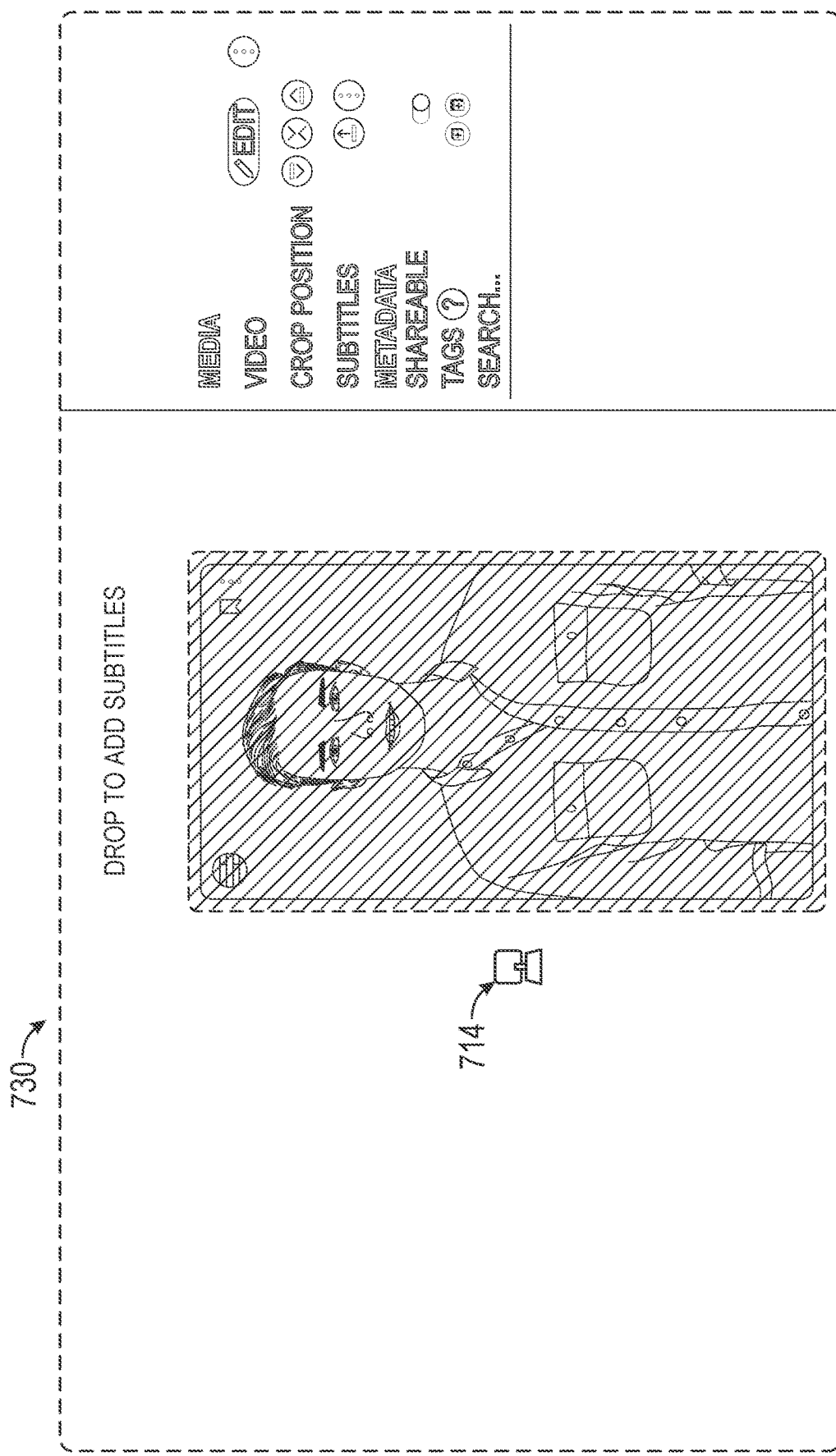

FIGS. 7B-D are illustrative inputs and outputs of the subtitle control system 124, according to example embodiments. FIG. 7B shows a screen 710 that lists identifiers 712 of each of a set of video files a given user has previously uploaded. In some implementations, the screen 710 may include subtitles indicators for each of the identifiers 712 indicating whether a subtitles file has previously been uploaded and associated with a corresponding video of the respective identifier 712. A first indicator may indicate that a subtitles file has been received and a second indicator may indicate that a subtitles file has not been received. The indicators may be presented within each identifier 712 and/or outside of a region displaying each identifier 712.

A user can access a subtitles file (in a particular format) from local storage and use a cursor 714 to drag the subtitles file over a given one of the identifiers 712. Once the user releases the cursor 714 while hovering over a given identifier, the subtitles file that is dragged is uploaded and automatically associated with the video corresponding to the given identifier. To do so, the subtitle control system 124 retrieves an identifier or title of the video corresponding to the given identifier and stores in a database the received subtitles file (and any conversions thereof) with the retrieved identifier of the video. In some embodiments, the cursor 714 may be hovered over a given one of the identifiers 712. As the cursor 714 hovers over a given identifier 712, an option is displayed for the user to select to upload a subtitles file for the given identifier 712. After the subtitles file is uploaded, the contents of the subtitles file are presented to the user in a graphical user interface that also allows the user to preview and edit the subtitles file and the video associated with the subtitles file.

If a user adds subtitles over an identifier 712 for which subtitles have previously been received, the previously received subtitles are overwritten by the new subtitles files that the user drags over the identifier 712.

Display 720 in FIG. 7C presents another graphical user interface for adding subtitles for a given video being edited. Particularly, display 720 includes video editing options for a given video a user has uploaded. The video editing options include an upload subtitles option 722. In response to the user selecting the subtitles option 722, the user may be provided with a menu allowing the user to indicate a storage location of a subtitles file for the video in the display 720. After the user selects the storage location, the subtitles file (and a conversion thereof) is uploaded and associated with the video. In some implementations, while viewing display 720 for a video the user is editing, rather than selecting the subtitles option 722, the user can drag and drop a given subtitles file within the display 720. Display 730 in FIG. 7D shows a subtitles file being dragged and dropped over a video being edited. After dropping or releasing the subtitles file with cursor 714 within the display 730, the subtitles file (and a conversion thereof) is uploaded and stored in association with the video being edited.

Figure 7E:
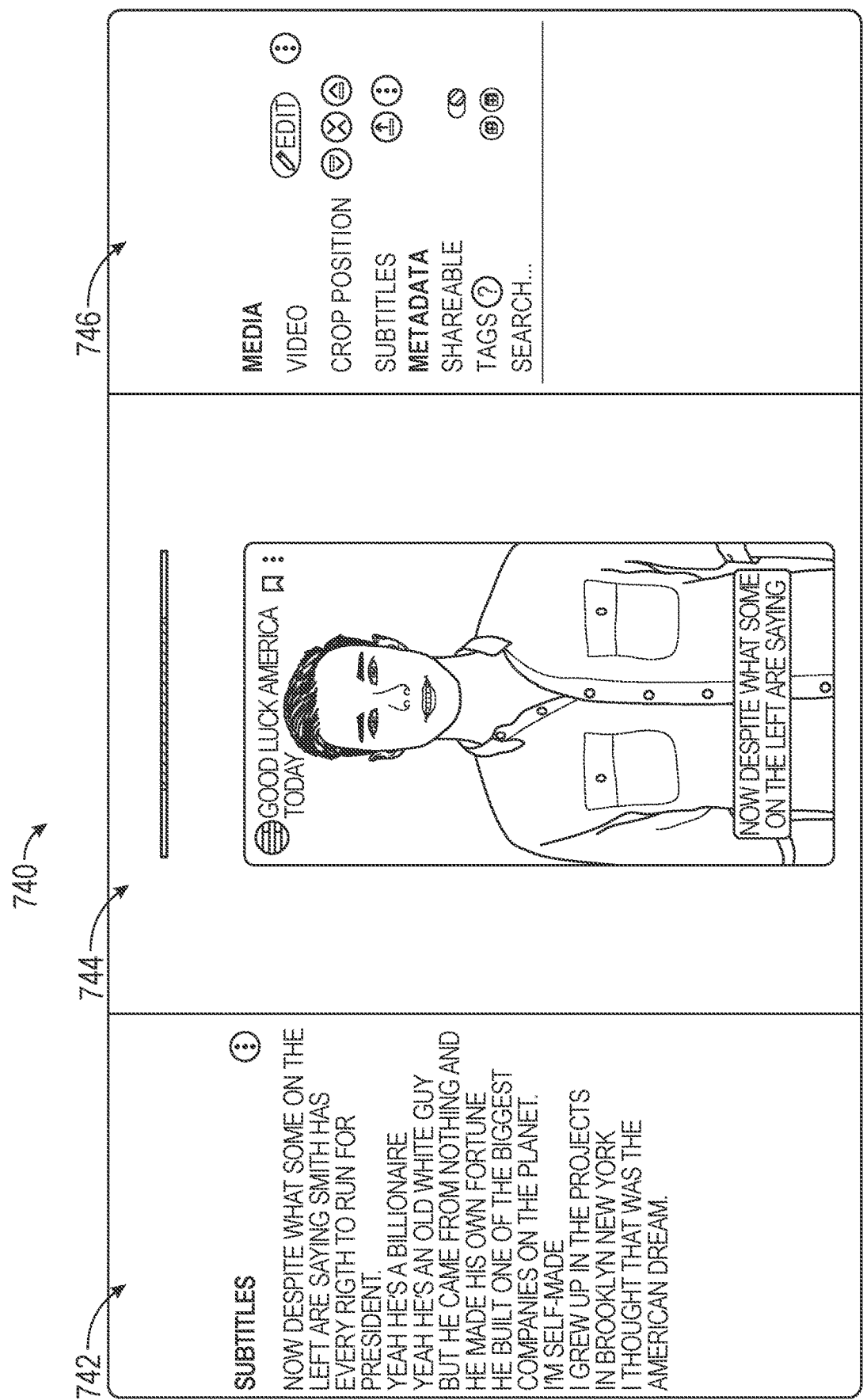

FIG. 7E shows a three-part display 740 after a subtitles file is uploaded for a given video. The three-part display 740 includes a first region 742, a second region 744, and a third region 746. First region 742 displays content of the subtitles file that is received. The user can interact with the subtitles presented in first region 742 to edit the subtitles, rearrange the subtitles, change timing of when specific subtitles are presented, and/or change the visual characteristics of the subtitles that are presented. The second region 744 displays a preview of the video. The preview may be played to see how the subtitles the user added are presented for the video that was uploaded. The positioning of the subtitles over the video (e.g., to display some subtitles at the top for one video frame and some at the bottom of a second video frame) can be adjusted by the user so as to avoid having the subtitles interfere with the content. In some implementations, the subtitles by default are presented at the bottom of the screen but the default position can be modified and overridden by specifying the specific position in which to display certain subtitles in the first region 742. The third region 746 provides editing options for the video. Third region 746 also includes an option to delete subtitles that are associated with the video that was uploaded.

Figure 8:
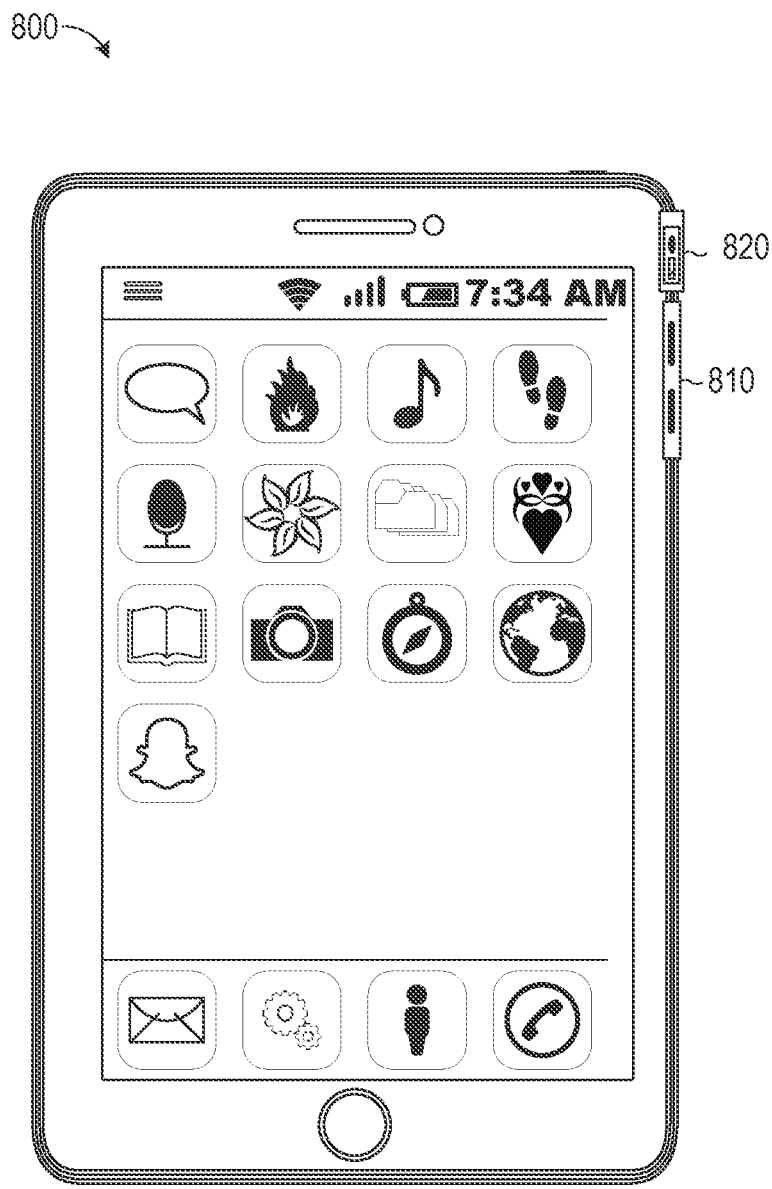
FIG. 8 shows an illustrative mobile user device that employs the subtitle control system, according to example embodiments.

FIG. 8 shows an illustrative mobile device 800 that employs the subtitle control system 124, according to example embodiments. Mobile device 800 includes a physical mute switch 820 and physical volume controls 810 (that include a volume UP button or key and a volume DOWN button or key). Physical mute switch 820 can be physically moved between two positions, a mute position and an unmute position. The mute position disables audio output of the mobile device 800 but can be overridden by pressing a volume UP button while viewing some content. In such cases, audio of the content is presented to the user but audio of subsequent content remains muted because the physical mute switch is in the mute position. The unmute position allows audio to be output by the mobile device 800 at a volume level that is controlled by the physical volume controls 810. Volume controls 810 include a volume DOWN button. Selecting or pressing the volume DOWN button a number of times gradually reduces a volume level of the mobile device 800 (e.g., by a certain predetermined amount each time the volume DOWN button is pressed). When the volume is reduced by pressing the volume DOWN button enough times to reach a mute state (in which the volume level is set to 0%), subtitles for videos are automatically presented in a video discovery graphical user interface.

Figure 9:
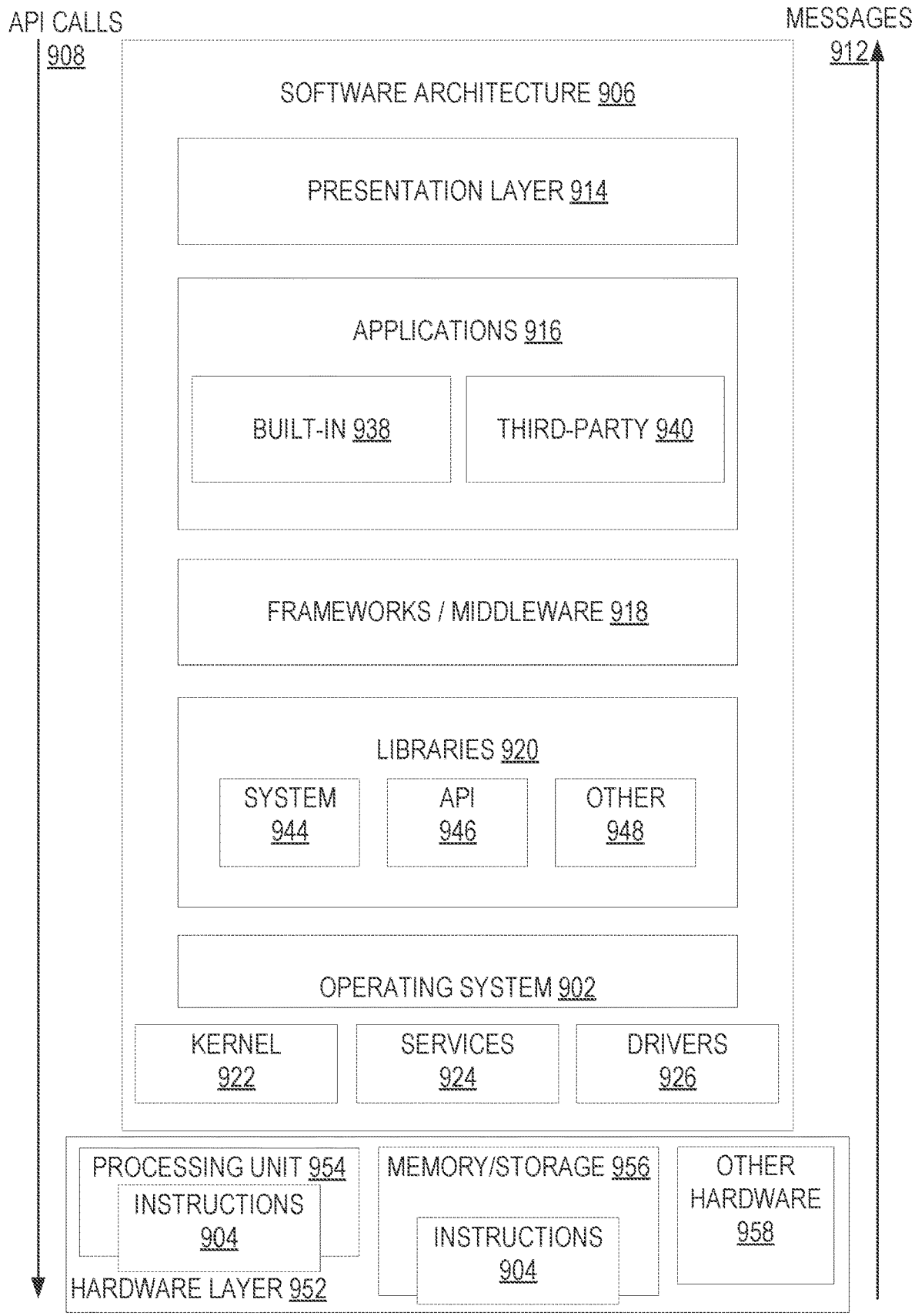
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
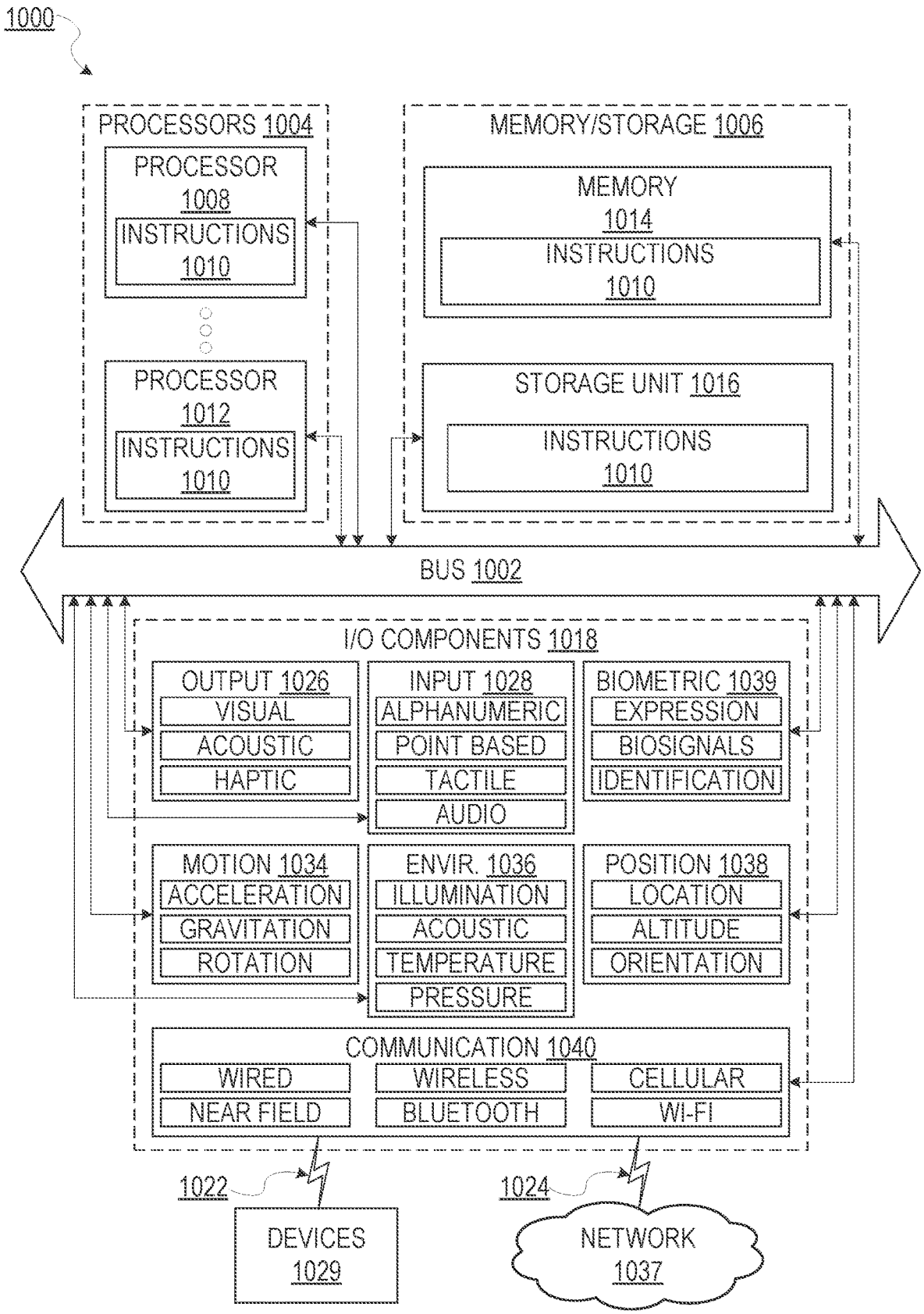
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   storing, in association with a first video, a first subtitles file in a first format of a plurality of formats comprising a SubRip Text (SRT) file;
   storing, in association with the first video and together with the first subtitles file comprising the SRT file, a second subtitles file in a second format of the plurality of formats comprising a Video Timed Text (VTT) file; and automatically selecting between the first subtitles file comprising the SRT file and the second subtitles file comprising the VTT file based on a type of device on which the first video is being presented.

2. The method of claim 1, further comprising:
automatically retrieving the subtitles file in the first format corresponding to a type of a user device on which the first video is being presented; and
causing subtitles of the first video to be displayed by the user device during presentation of the first video based on the retrieved subtitles file.

3. The method of claim 1, further comprising:
receiving data indicating a press and hold action was performed, in which a user maintains physical contact, for a threshold period of time, with a screen in which the first video is being displayed; and
in response to receiving the data, overlaying a menu on top of the first video that includes an option to toggle a subtitles setting, the menu including a language selection option to control language of the subtitles.

4. The method of claim 1, further comprising:
determining that a default subtitles setting is set to an enabled state; and
in response to determining that the default subtitles setting is set to the enabled state, automatically causing the subtitles to be displayed during playback of the first video independently of receiving user input that reduces volume.

5. The method of claim 1, further comprising:
determining that a subtitles setting of a video discovery graphical user interface is set to an enabled state; and
in response to determining that the subtitles setting of the video discovery graphical user interface is set to the enabled state, automatically causing the subtitles to be displayed during playback of the first video independently of receiving user input that reduces volume.

6. The method of claim 1, further comprising determining that a physical switch is set to an unmute position in which audio output is enabled.

7. The method of claim 1, further comprising:
prior to receiving a user input that reduces volume and while volume is unmuted, receiving a user selection of a second video; and
presenting the second video without presenting subtitles for the second video.

8. The method of claim 7, further comprising while the second video is being presented:
retrieving the subtitles associated with the second video; and
automatically initiating presentation of the retrieved subtitles with the presentation of the second video.

9. The method of claim 8, wherein the first video is sequentially displayed with the subtitles of the first video after the second video is presented.

10. The method of claim 1, further comprising:
automatically converting the subtitles file in the first format to the second format.

11. The method of claim 1, further comprising:
exiting a video discovery graphical user interface;
receiving user input that increases volume during access of a given feature to an unmuted state;
returning to the video discovery graphical user interface after the given feature has been accessed; and
preventing subtitles from being presented during initial playback of a second video after returning to the video discovery graphical user interface.

12. The method of claim 1 further comprising:
receiving a request for subtitles for the first video, the request specifying the type of device, wherein the subtitles file is retrieved based on the received request;
displaying visual representations of a plurality of videos; and
determining whether a subtitles file has previously been associated with a given video in the plurality of videos.

13. The method of claim 12, further comprising:
displaying a subtitles indicator for a visual representation of the visual representations corresponding to the given video in the plurality of videos in response to determining that the subtitles file has previously been associated with the given video.

14. The method of claim 1, further comprising:
displaying a video editing graphical user interface;
adding a given video of the plurality of videos to the video editing graphical user interface; and
uploading a subtitles file in the plurality of formats for the given video via the video editing graphical user interface.

15. The method of claim 14, wherein adding the given video comprises dragging a video file and dropping the video file into the video editing graphical user interface, and wherein uploading the subtitles file comprises dragging and dropping the subtitles file into the video editing graphical user interface or selecting a subtitles upload option in the video editing graphical user interface.

16. The method of claim 14, further comprising:
receiving a first input that changes a visual characteristic of the subtitles in the subtitles file; and
receiving a second input that adjusts a default display position of the subtitles in the subtitles file, wherein a first portion of subtitles are displayed at a top of a first video frame of the first video and a second portion of the subtitles are displayed at a bottom of a second video frame of the first video based on the second input.

17. The method of claim 1, further comprising modifying visual characteristics of displayed subtitles file based on a display characteristics field associated with the subtitles file, the visual characteristics comprising a font size, a font color, and a shape.

18. A system comprising:
at least one processor configured to perform operations comprising:
storing, in association with a first video, a first subtitles file in a first format of a plurality of formats comprising a SubRip Text (SRT) file;
storing, in association with the first video and together with the first subtitles file comprising the SRT file, a second subtitles file in a second format of the plurality of formats comprising a Video Timed Text (VTT) file; and
automatically selecting between the first subtitles file comprising the SRT file and the second subtitles file comprising the VTT file based on a type of device on which the first video is being presented.

19. The system of claim 18, wherein the operations further comprise:
receiving a first input that changes a visual characteristic of the subtitles in a subtitles file comprising the plurality of formats; and
receiving a second input that adjusts a default display position of the subtitles in the subtitles file, wherein a first portion of subtitles are displayed at a top of a first video frame of the first video and a second portion of the subtitles are displayed at a bottom of a second video frame of the first video based on the second input.

20. A non-transitory machine-readable storage medium that includes instructions that, when executed by one or more processors of a machine, cause the machine to perform operations comprising:
    storing, in association with a first video, a first subtitles file in a first format of a plurality of formats comprising a SubRip Text (SRT) file;
    storing, in association with the first video and together with the first subtitles file comprising the SRT file, a second subtitles file in a second format of the plurality of formats comprising a Video Timed Text (VTT) file; and
    automatically selecting between the first subtitles file comprising the SRT file and the second subtitles file comprising the VTT file based on a type of device on which the first video is being presented.

* * * * *